United States Patent

Marbury et al.

[15] 3,655,918

[45] Apr. 11, 1972

[54] TRUNK ALLOTTER

[72] Inventors: Benjamin R. Marbury, Oak Lawn; Alfred M. Hestad, Chicago; Jose Reines, Glen Ellyn, all of Ill.

[73] Assignee: International Telephone and Telegraph Corporation

[22] Filed: Apr. 17, 1970

[21] Appl. No.: 29,600

[52] U.S. Cl. ........................................179/18 GF, 179/18 FF
[51] Int. Cl. ........................................................H04q 3/42
[58] Field of Search ..............179/18 GF, 18 AB, 18 FF, 18 E

[56] References Cited

UNITED STATES PATENTS

| | | | |
|---|---|---|---|
| 3,324,248 | 6/1967 | Seemann et al. | 179/18 E |
| 3,328,531 | 6/1967 | Platt et al. | 179/18 FF |
| 3,336,443 | 8/1967 | Benmussa et al. | 179/18 GF |
| 3,480,735 | 11/1969 | Mnichowicz et al. | 179/18 AB |

*Primary Examiner*—Kathleen H. Claffy
*Assistant Examiner*—William A. Helvestine
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

A trunk allotter controls a number of parallel switches connected between the allotter and a number of circuits which are segregated into groups. When a switch is to be operated, there is a large supply of current which is sufficient to insure operation of at least one—and probably several—parallel switches. By its operation, the switch pre-selects an idle circuit. Then, the current is reduced to a level which is sufficient to hold only one of the parallel switches and to turn off the remainder of the switches. After the allotter operates, a counter steps on to enable the allotter to allot one of a second group of equivalent circuits.

16 Claims, 6 Drawing Figures

INVENTORS
BENJAMIN R. MARBURY
ALFRED M. HESTAD
JOSE REINES
BY
Alter, Weiss & Whitesel
ATTORNEYS

TRUNK ALLOTTER

This invention relates to electronic telephone switching systems and more particularly, to trunk alloters for use in such systems.

Reference is made to U.S. Pat. No. 3,324,248 and to Patents cited therein, for a disclosure of a system similar to the one disclosed in this application. Additional details concerning the invention may be learned from a study of these and other patents, assigned to the assignee of this invention.

Generally, a telephone switching system includes a network of crosspoints for interconnecting particular ones of many things with any idle one of a few things. For example, the many things may be subscriber lines. The few things may be control circuits, trunks, registers and the like. It is apparent that the selection of the many things must be on an individual or a particular selection basis (i.e., a particular calling line must be connected to a particular called line ). On the other hand, as long as a calling subscriber reaches a called subscriber, it is not relevant whether the connection is by way of any particular one of several trunk or control circuits. All are equivalent to each other.

Accordingly, the network for connecting a calling line to a called line must be driven responsive to digital information, or the equivalent thereof. On the other hand, an idle circuit selector or allotter is all that is required for connecting one of the registers, trunks or the like, to serve a particular call. The characteristics of such an allotter are that it must not select a busy circuit, and it must rotate its selections so that it does not select the same circuit during two or more consecutive operations. For an example of this need for rotation, consider the catastrophic nature of a failure which would follow if the allotter always assigned the same defective register or trunk circuit, and that defective circuit prevented operation of the system as a whole.

Hence, an object of this invention is to provide new and improved allotter circuits. Here, an object is to select or allot the first available one of a plurality of equivalent circuits to serve the needs of a particular call. In this connection, an object is to rotate the selection so that the same circuit is not sequentially allotted to serve two or more consecutive calls.

Another object of the invention is to allot circuits in an electronic switching system. Here, an object is to facilitate the completion of calls at electronic speeds. In this connection, an object is to allot individual ones of many trunks which may be accessed responsive to prefix digit or digits.

Still another object of this invention is to operate the crosspoints of a switching network in a manner which gives an allotter random access to any one of many equivalent circuits, without allotting the same circuit twice in sequence.

In keeping with an aspect of the invention, these and other objects are accomplished by providing a switching network having a number of parallel current controlled switches connected between the allotter and a number of circuits which are equivalent to each other. These equivalent circuits are segregated into groups any one of which groups is enabled at any given time. Initially, the allotter provides a large supply of current which insures that at least one, and perhaps many switches are operated by the allotter, thereby pre-assigning at least one idle allotted circuit in the enabled group. Then, the current is reduced to a level which is sufficient to hold only one of the parallel current controlled switches. The remaining switches starve for want of current, and they turn off. After the circuit is so allotted, a counter steps on to enable the allotter to repeat the effort with a second of the groups of circuits. This way, the allotting does not come from the same group during any two successive attempts.

The above mentioned and other features and objects of this invention, and the manner of obtaining them will become more apparent and the invention itself will be best understood by reference to the following description of an embodiment of this invention taken in conjunction with the accompanying drawings, in which.

Figure 1:
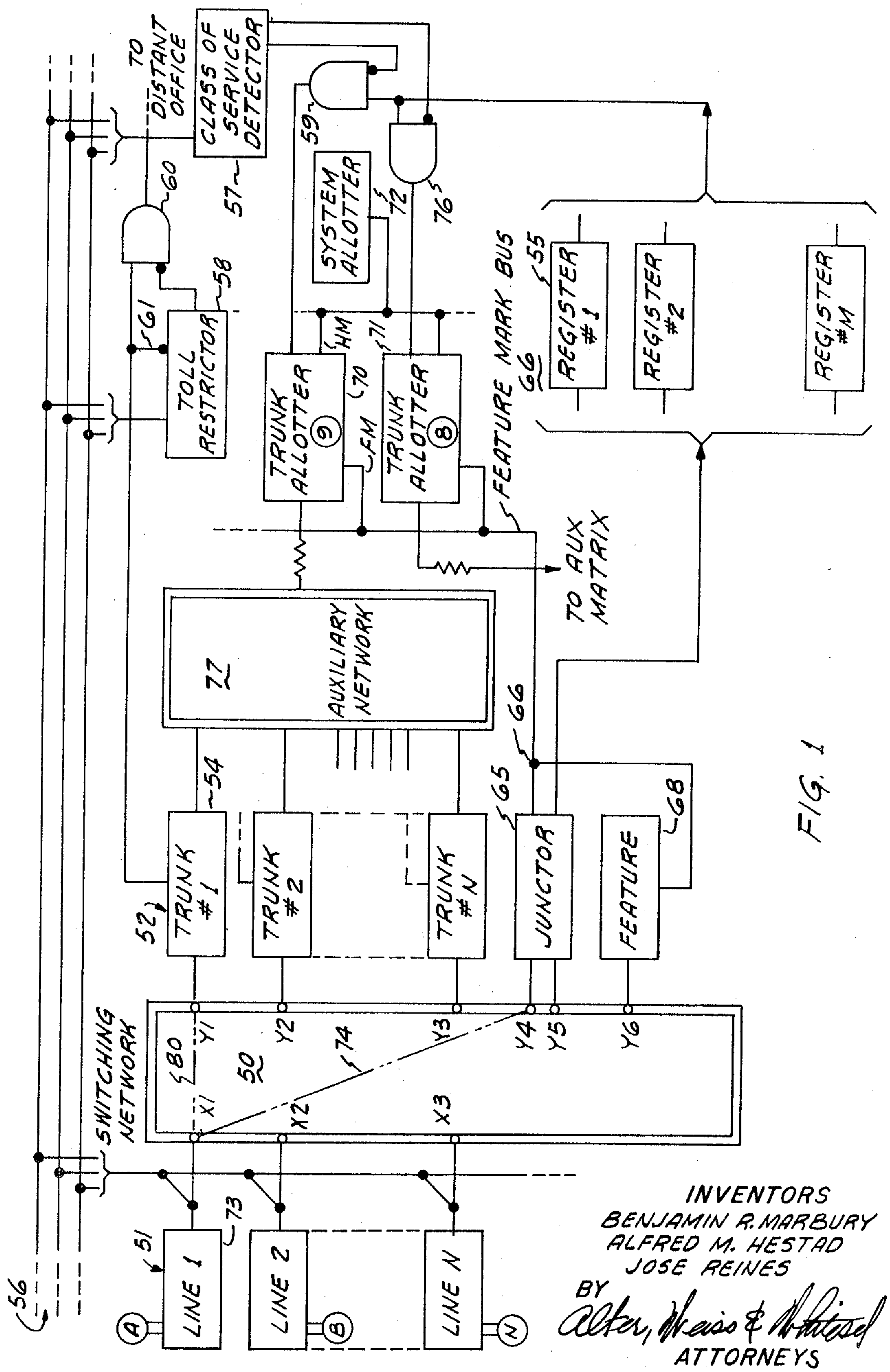
FIG. 1 is a block diagram of an electronic telephone switching system, incorporating the invention.

The major portions of FIG. 1 are a switching network 50 having lines 51 connected to one side and control circuits 52 connected to the other side. The control circuits 52 contain a number of circuits which are equivalent to each other. By way of example, the drawing shows a trunk circuit 54 which is duplicated N number of times. Likewise, a register is duplicated M number of times. If the particular trunk circuit 54 is busy, any other one of the N trunks may be selected because each gives identical service. Likewise, if the particular register 55 is busy, any other one of the M registers may be selected because each gives identical service.

Class of service busses 56 run across the system, connecting on one end to the lines 51 and on the other end to class of service circuit 57 and toll restrictor circuit 58. Whenever the lines 51 end-mark the network 50 (as at the point X1), class of service identification potentials appear in coded combination on the busses 56, according to coded diode connections between the line circuits and the busses 56. The class of service detector circuit 57 monitors this combination of potentials to detect whether the calling line is or is not entitled to any particular class of service. For example, if the subscriber who is marking the class of service busses 56 is not entitled to dial 9, and gain access to a city trunk, the class of service detector 57 marks an inhibit gate 59 to bar such access. If the subscriber is entitled to make such a call, the potentials which mark the busses 56 prevent the class of service detector 57 from inhibiting the gate 59.

The toll restrictor 58 is also connected to the class of service busses 56 to monitor the right of a subscriber to dial certain directory numbers. For example, one area code may be acceptable to the identified class of subscriber, and another area code may be unacceptable. If considering the class of subscriber, an unacceptable code is dialed, the toll restrictor 58 detects the restricting code at 61 and inhibits the gate 60 to bar access to the distant office. If an acceptable code is dialed, the toll restrictor 58 detects the enabling code at 61 and does nothing. Gate 60 is not inhibited, and the trunk call is allowed to go through.

The junctor 65 is a general purpose circuit which completes a connection through the network 50, supplies battery to the conversing subscribers, supervises and monitors the duration of the call, and releases the connection at the end of the call. When a calling subscriber dials a number requiring a feature circuit, the junctor 65 marks a feature bus 66 in a manner which identifies the desired feature. For example, if the first digit is 9, the junctor 65 marks bus 66 to enable the trunk circuit 54.

The feature circuit 68 represents any of many special facilities which may be provided in the system. For example, this feature could be camp-on busy, executive right of way, or the like.

The system allotter 72 is a common clock which enables every circuit in the entire system to perform its function during an appointed time period in a program of time periods.

Next to be described is the manner in which a call may be extended through the network. In general, the line circuits 51 place a demand for service by applying an end-marking potential at an individually associated point marked X on the line side of the network. Control and common equipments 52 assigned to serve each call, place another end-marking at an individually associated point marked Y on the control side of the network. Responsive to these two end-markings, a self-seeking path finds its own, unguided way from one end-marking over randomly selected crosspoints to the other end-marking, as over the dot-dashed line 74, for example.

More particularly, at any given time, system allotter 72 marks a particular general purpose junctor 65 as the circuit which is assigned to serve the next call. The assigned junctor then stands marking the point Y4. No other junctor is allotted at this instant—no other Y end-marking can be applied to the right-hand side of the network 50.

When a subscriber at station A, for example, removes a receiver or hand set to place a call at the described instant, an end-marking appears at point X1 as a request for service. The potential difference between the end-markings appearing at the points X1, Y4 causes the self-seeking path 74 to find its way through the network 50. The path can extend to no place except point Y4 since there are no other Y markings at this time.

If several X markings are present, several paths may be allowed to race for the same Y4 marking. Or, an individual X point may be enabled. Either way, it is virtually certain that one path will reach the marked point Y4 before any other path gets there.

The first completed path eliminates the potential difference between the X and Y end-markings. Therefore, current cannot flow over the uncompleted paths, and the PNPN diodes in those paths must starve and wait for a chance to race out toward the next Y marking, which will appear when the allotter 72 allots the next idler junctor.

After the calling subscriber dials a wanted number, a register (such as 55) causes the called line B to place an end-marking at point X2, and the junctor circuit 65 end-marks the point Y5. Then, another self-seeking path (not shown) finds its way through the network. The junctor circuit 65 now interconnects the points Y2 and Y5, to complete a talking path from the calling line to the called line.

To provide special features, the common signal busses 66 are selectively marked during an allotter time frame which identifies a particular circuit involved in a particular call. Because of the time frame, all system equipments are momentarily individualized to the particular circuit serving this particular call. The junctor 65 drops its connected paths through the network 50. The potential at point X1 moves back toward the end-marking potential because the network path is then open. Whenever the line side access point returns to or near this end-marking potential, a marking appears at point X1. If there is then an end-mark at a point Y of a particular feature circuit a new path fires through the network. Since all of these path switching functions occur at electronic speeds, the subscribers do not realize when the paths over which they are talking are connected or disconnected and reconnected.

The construction and operation of the system described thus far is somewhat typical of all end-marked networks of the described type. The invention is primarily concerned with various control circuits, shown on the right-hand side of the network 50. In particular, the invention is concerned with providing an allotter function. As here shown, a trunk allotter 70 or a trunk allotter 71 is operated if the first number dialed is either the digit 9 or 8, respectively. It is here assumed that a single digit 9 may be dialed to gain access to a trunk leading to a distant office. The single digit 8 may be dialed for some other purpose as to gain access to a tie line, for example.

It is thought that the trunk allotter may be understood best from the following description of how a digit 9 call is handled. It is assumed that the system is a PBX set up to give access to outside trunks when the digit 9 is dialed alone. The distant office returns dial tone, and then the calling subscriber transmits the digits of a directory number which sets equipment in that office to complete a connection therein.

In general, the trunk circuit 54, for example, is allotted and the original path 74 is dropped. As it drops the path 74, the junctor 65 marks the feature mark bus 66 to indicate that the allotted trunk should end-mark the point Y1. A new path 80 is fired from the calling line end-marking point X1, through the network 50 to the trunk circuit end-marking point Y1. The trunk circuit 54 places a demand upon the distant office which returns dial tone. Responsive thereto, the calling subscriber dials a wanted directory number. The toll restrictor 58 has stored therein the class of service signals which appeared on busses 56 when path 74 was dropped and the new path 80 fired. If the digits monitored at 61 coincide with a directory number of a calling line authorized for this class of service, nothing happens. However, if the monitored digit is not authorized, the gate 60 is inhibited, the distant office releases, and busy tone is returned to the calling subscriber.

In greater detail, the calling subscriber removes a hand set, thereby marking the class of service busses 56 and the switching network end-marking point X1. It is assumed that the class of service detector 57 detects signals which indicate that a digit 9 call is authorized. The marking at point X1 causes an establishment of a path 74 to a point Y4 of a general purpose junctor 65, which happens to be allotted at this time. The junctor 65 seizes a register 55 which returns dial tone to the calling subscriber station.

The calling subscriber hears the dial tone and dials the digit 9. The register 55 stores this digit and signals the digit 9 trunk allotter 70 via the gate 59. If the calling subscriber is not authorized to place a digit 9 call, the gate 59 is inhibited by the class of service detector 57. Since authorization has been assumed, the allotter 70 operates an auxiliary matrix 77 in a manner which selects or pre-assigns a particular trunk circuit in a group of trunk circuits, and causes that trunk circuit (such as 54) to be connected to the calling subscriber. The network 77, allotter 70 and register 55 are then released.

Figures 2, 3:
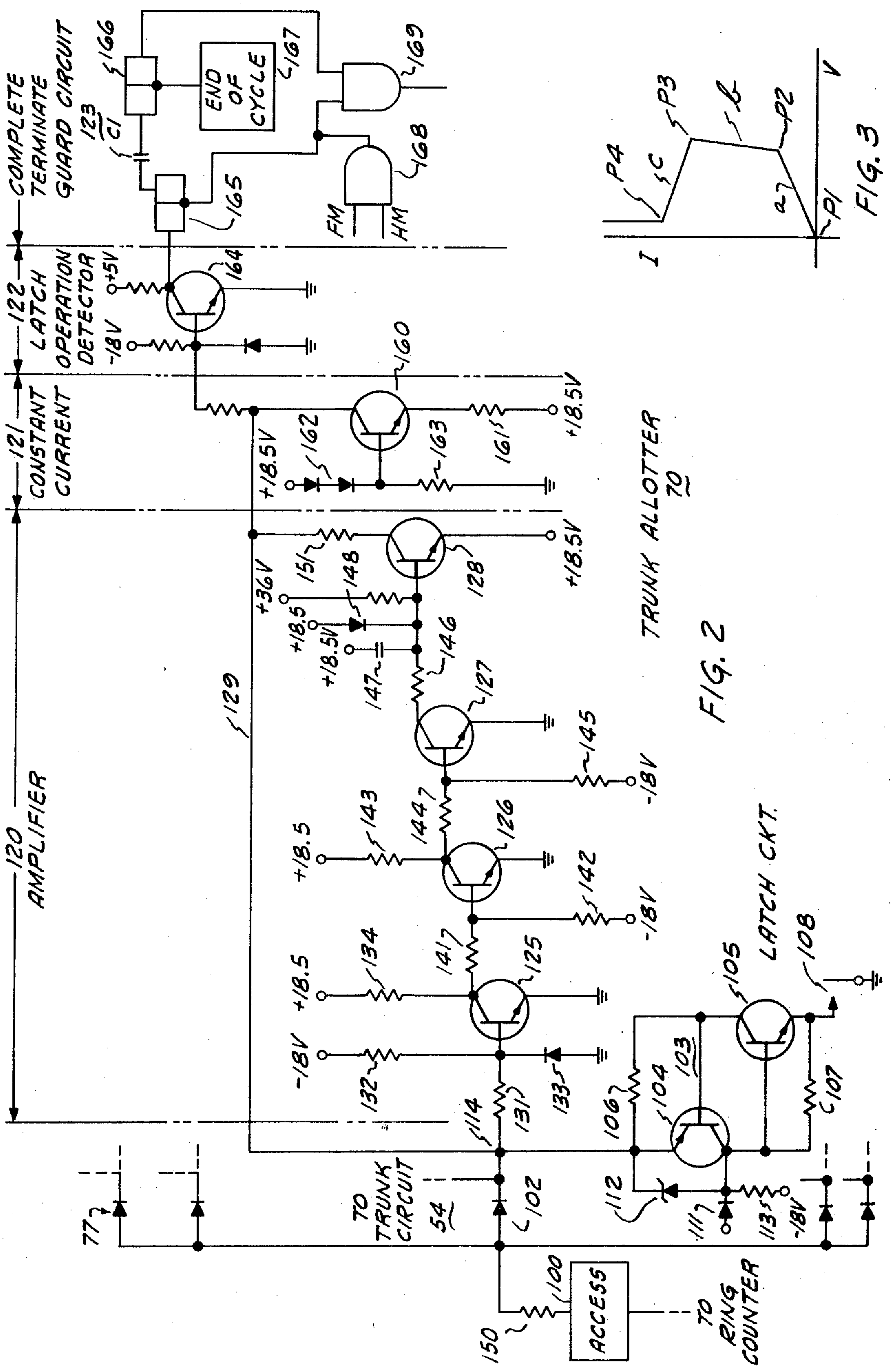
FIG. 2 is a schematic circuit diagram of the allotter portion of the network of FIG. 1.
FIG. 3 is a current voltage diagram which helps explain the crosspoint operation.

Details of the trunk allotting function should become clear from a study of FIG. 2. FIG. 1 was drawn to illustrate the functional nature of the various devices; however, FIG. 2 is drawn to show how the various components are interconnected to provide the desired functions. Hence, these two drawings do not always lend themselves to a simple 1-to-1 comparison.

In general, the register 55 connects to an access circuit 100 which is commonly coupled to one side (here the anode side) of a network of parallel switches, which may be general purpose diodes, for example. These diodes perform the switching function represented by the auxiliary network 77. The trunk circuits 52 are individually connected on the other sides (the cathode sides) of these diodes (as indicated by the notation "To Trunk Circuit 54"). The function of the trunk allotter circuit 70 is to cause one of the diodes to conduct and thereby pre-assign the individually associated trunk circuit. For example, if diode 102 conducts, the trunk circuit 54 is assigned. Since all trunks are equivalent, any one of these diodes may be made conductive, with the only restrictions being that no diode should conduct if it is associated with a busy trunk, and no more than one diode should remain conductive after the assignment. To preclude the selection of a busy trunk, each diode has a latch circuit individually associated therewith, as diode 102 is shown associated with latch circuit 103 which is connected to its cathode.

The latch circuit 103 includes a PNP transistor 104, an NPN transistor 105, a pair of current limiting resistors 106, 107 and a busy switch 108 operated by the trunk circuit. This switch is controlled by three conditions: (1) the trunk busy or idle condition, (2) a group trunk allot function, or (3) a general allot enable signal. When the trunk is idle and allotment is possible, switch 108 is closed to supply a group potential which can hold the latch 103 in an "on" condition.

The diode 111 applies a positive bias voltage to the collector of the PNP transistor 104, which pre-conditions the latch circuit to stand at a threshold level. A zener diode 112 is coupled across the emitter and collector of the PNP transistor 104 to cause a rapid turn-on when a voltage applied at point 114 reaches about 45 percent of a desired switching potential. A resistor 113 is part of several voltage dividing circuits for supplying the required biasing potentials.

Each allotted trunk circuit has therein the equivalent of a switch circuit having a gate input connected to an enable lead marked from the point 114, FIG. 2. The trunk circuit switch is floating at some busy potential when the associated trunk is busy so that the potential at point 114 has no effect. When the trunk becomes idle, a ground is applied to clamp the switch in an enabled condition. This clamping ground causes the switch circuit to be triggered when the allotter supplies an enable signal at the point 114. When this occurs, there is enough current for many switch circuits to turn on. Thereafter, a holding current is provided in such a limited amount that only one switch circuit can remain conducting. Therefore, only one trunk can be allotted at a time.

The operation of the latch circuit is explained by the curve of FIG. 3 which indicates how the voltage changes at point 114, voltage being indicated along a horizontal scale. The current changes through this point are indicated along a vertical scale. Normally, the voltages have a potential such that each of the diodes 77 is back biased. The point 114 is standing near ground or zero potential (point Pl. FIG. 3).

When the access circuit 100 places a demand, the potential at the anodes of each of the diodes 77 moves positive, until at least one diode—and maybe several—is forwardly biased. For example, the diode 102 may begin to conduct. The emitter of PNP transistor 104 moves positive relative to the battery potential applied from the voltage divider comprising resistors 113 and 107 to its collector.

The transistor 104 begins to draw current, which increases the voltage at point 114 relatively slowly as indicated by the line segment *a* of FIG. 3. When some voltage level, point P2, is reached, the zener diode 112 breaks down. There is a rush of current with only little additional change in voltage, at the point 114, as shown by the line segment *b*. As current is injected into the base of the transistor 105, its collector becomes more positive relative to its emitter, and it begins to conduct.

An avalanche occurs (point P3) as the current through the transistors 104, 105 drive each other on and into a saturation. While this avalanche occurs, there appears to be a negative impedance, as indicated by the line segment *c*. When the voltage and current reach point P4, both transistors are fully saturated and the latch is turned on to pre-assign the individually associated trunk circuit 54, which is connected to the point 114. The latch circuit is now turned on and it is held on until release of the crosspoint. The point 114 then returns to the off condition indicated at point P1.

Hence, it should be obvious that the crosspoint comprises a switch 102 and a memory circuit 103 which is latched to remember the "on" condition 103 and released to remember the "off" condition. While the latch is "on" the trunk 54 is pre-assigned, and standing ready to serve the next call, when it appears. When it does appear, the associated trunk circuit 54 becomes busy and it opens the switch 108 (which may be a transistor ) to remove ground potential from the emitter and collector of the transistors 105, 104 respectively. The various bias potentials are such that the current flowing from the access circuit 100 through the diode 102 can not trip the latch circuit 103 when the switch 108 is open. Hence, it is not possible for the trunk allotter to select a busy trunk circuit.

The remainder of the trunk allotter (shown in FIG. 2) comprises a circuit for controlling, firing and holding the latch circuit 103. This circuit includes an amplifier 120, a constant current source 121, a latch operation detector 122, and a complete termination guard circuit 123.

The amplifier 120 includes three amplifying transistors 125-127 which supply a substantial gain to signal changes appearing at point 114. The transistor 128 is an electronic switch that is either "off" or "on" and saturated. In the state where the trunk is pre-assigned, and the latch circuit 103 is off, the bias is such that transistors 125, 127, 128 are off and transistors 126 is on. When the latch circuit turns on, the switch 128 is turned on, and a current is fed back over wire 129, through the latch circuit 103, and to the ground at switch 108. This feedback current holds the latch circuit in its turned on condition.

The remainder of the components in the amplifier 120 includes a coupling and current limiting resistor 131 and a clamping circuit 132, 133 for protecting the transistor 125. This circuit drains off the leakage current without allowing the base of transistor 125 to become more negative than ground, less the voltage drop across the diode 133. Thus, there can not be a reverse bias responsive to the leakage through the turned off transistor 125.

Resistor 134 is a load for the transistor 125. The resistor 141 couples and limits current. The resistor 142 supplies a base bias for the transistor 126. The circuits for transistors 126 and 127 include a load 143, current limiter 144, bias source 145, and a current limiting resistance 146. The capacitor 147 slows the effect of any voltage change at the base of the transistor 128, and prevents switching in response to transients. The diode 148 is part of a clamping circuit.

There is a stable condition in the latch 103 when the associated trunk is pre-assigned or allotted to serve the next call. At this time, the latch circuit of the pre-assigned trunk is turned on and drawing current over wire 129. The latch 103 turns off when the assigned trunk is taken into use.

The amplifier 120 operates this way. If the associated latch circuit 103 is not in a fired condition, the circuit 120 functions to fire the latch when the trunk allotter next operates. If the diode 102 conducts, the point 114 and the base of NPN transistors 125 become more positive, relative to its emitter. The transistor 125 turns on and applies ground to the lower end of the resistor 134. Responsive thereto, the voltages divide across resistors 141, 142 in a manner which makes the base of NPN transistor 126 negative relative to its emitter, and it turns off. The switching process repeats for the transistor 127. Removal of ground at the lower end of resistor 143 makes the base of transistor 127 positive relative to its emitter, and it turns on. The application of ground potential through resistor 146 to the base of transistor 128 causes it to turn on.

A relatively heavy current flows over the wire 129 to allow the potential on the anode of diode 102 to move further in a positive direction. At least one, and maybe a plurality of latch circuits, such as 103, fire. Resistors 150, 151 limit this current flow to the latch circuit so that there will not be a short circuit across the transistor 128 and diode 102.

As soon as the zener diode 112 fires in one of the latch circuits (such as 103), a negative potential is applied through resistor 113 to the base of the transistor 125, which turns off. The disappearance of the emitter ground from the collector of transistor 125 allows the positive voltage on resistor 134 to turn on the transistor 126. The emitter ground on transistor 126 is applied to the base of the transistor 127, which turns off. That, in turn, turns off the transistor 128. In doing so, the transistor 128 removes the heavy flow of current over the wire 129. The constant current source 121 includes an NPN transistor 160, which is always turned on and supplying enough current over wire 129 to hold only one latch circuit 103 in an on condition. However, this reduced current level is not sufficient to turn on any latch which has not fired as a result of a conductive diode. At this reduced level, the current flow through resistor 150 can not be divided between two or more latch circuits to hold them on. Therefore, all fired latches will starve and turn off except for the one which tends to draw all of the current. Therefore, only one latch circuit remains turned on to mark the point 114 with a voltage which pre-assigns an associated trunk.

The other elements of the constant current source 121 include a resistor 161 which provides the constant current action. A pair of diodes 162 and a resistor 163 which provide temperature compensation by cooperating with the resistor 106 and the semi-conductor devices in the latch circuit 103 to track each other as the ambient temperature changes. Hence, there are self-compensating changes so that stability is maintained despite temperature changes.

The latch operation detector 122 contains a transistor 164 which turns on and off as a function of whether the associated latch circuit is on or off. Once the transistor 164 switches state, the resulting output becomes a digital signal to be processed in any suitable manner by associated logic circuits (not shown).

Means are provided (here shown as latch guard circuit 123) for insuring that, once started, a complete trunk assignment cycle is carried out to completion. More particularly, the trunk appears as if it is busy when it is pre-assigned, responsive to the voltage change at the point 114 caused by the fired latch circuit 103. That naturally appearing busy signal can not be allowed to truncate the full latch cycle. Otherwise, all pre-assignments would be self-defeating. The invention solves this problem by completing the cycle if the size and busy conditions appear in that order, and terminating the cycle if the order is reversed.

The elements of the guard circuit 123 are a pair of flip-flop circuits 165, 166, and end of cycle detector 167, and a pair of AND gates 168, 169. The flip-flop 165 is set by the latch seize signal, and the AND gate 168 is set by a coincidence of FM and HM marks. The FM mark is a "feature mark" applied to bus 66 (FIG. 1), when a digit 9 call is detected by the junctor 65. The HM or hundreds mark appears when the system allotter 72 assigns the trunk allotter 70 a turn to operate.

In greater detail, if this is a normal trunk allotter call, the seize or trunk pre-assignment occurs first, and then the busy latch appears. The sequence is that the transistor 164 turns on to detect the conductive diode 102 and fired latch 103, before the features mark FM or hundreds mark HM signals appear. This sequence sets the flip-flop 165. Then, a pulse passes through the capacitor C1 to set the second flip-flop 166 and thereby mark AND gate 169. When the trunk allot feature mark FM and hundreds mark HM appear, the AND gate 168 resets the flip-flop 165 and enables the AND gate 169 to conduct. The output of gate 169 causes the trunk allotter to run through its entire cycle. Therefore, there is an enabling signal when the transistor 164 conducts before the FM and HM signals appear. After the end of a complete cycle, circuit 167 causes the flip-flop 166 to reset.

If the busy is a normal trunk busy (i.e., not a busy which occurs during a normal trunk selection and pre-assignment), the FM and HM signal appears first. The flip-flop 165 is held in its reset condition by the output of gate 168. The flip-flop 166 does not receive a set pulse via capacitor C1. Hence, the flip-flop 165 does not switch sides when the transistor 164 switches on. Therefore, the AND gate 169 cannot conduct to cause a complete cycle.

The point of providing the circuit 123 is that the trunk normally becomes busy during the allotting of a trunk. This busy mark from the trunk actually being selected can not be allowed to prevent this completion of the allot cycle, as indicated by the end of cycle detector circuit 167. On the other hand, if a trunk is already busy, before allotting, as it will be during normal busy conditions, the sequence must be reversed, and the allotting is barred.

Figure 4:
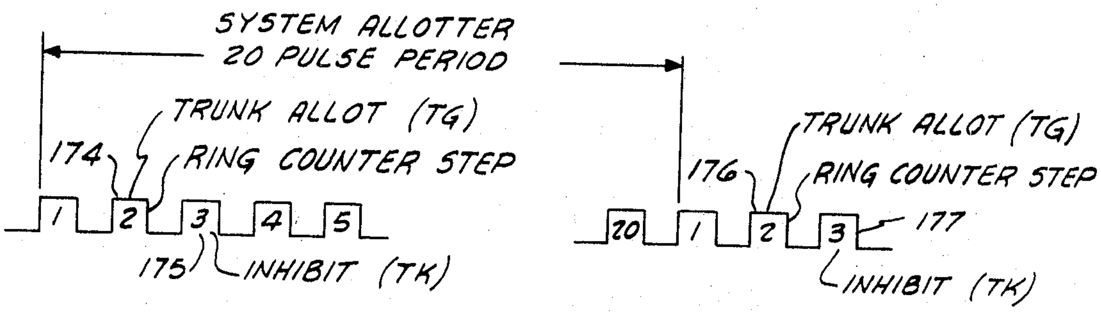
FIG. 4 is a graphical representation of the system clock pulses.
Figure 5:
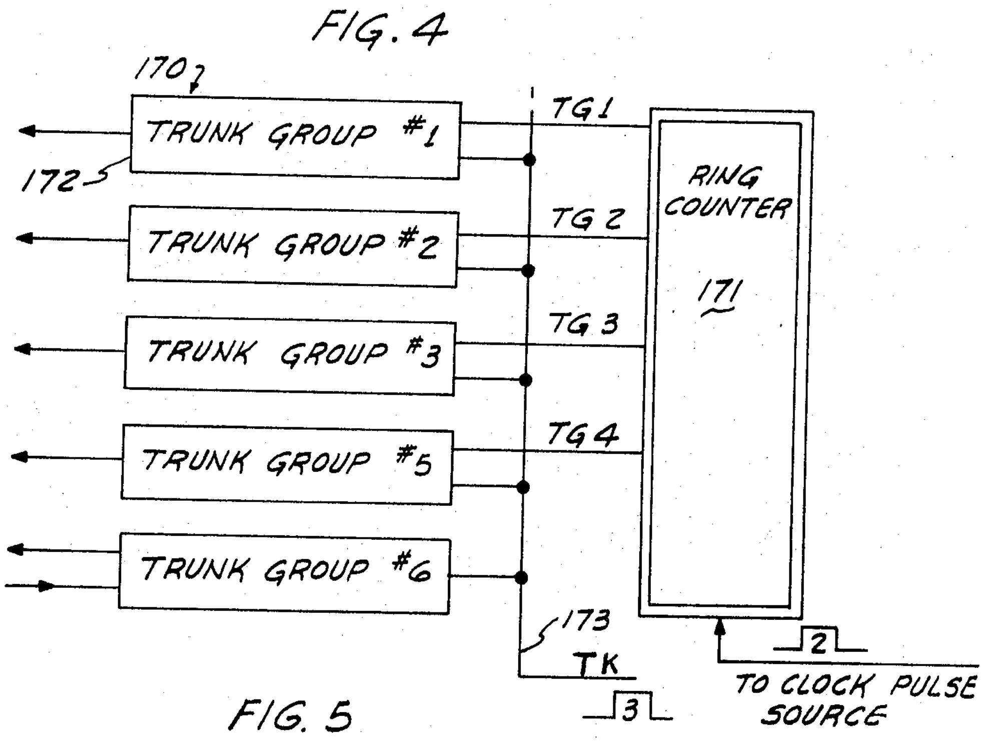
FIG. 5 is a block diagram which shows how the trunks are divided into groups.

Means are provided for insuring a rotation in the assigning trunk circuits. In greater detail, the manner of allotment rotation may become more apparent from a study of FIGS. 4 and 5. FIG. 4 shows system clock pulses generated by the system allotter 72. FIG. 5 shows an exemplary five trunk group 170,associated ring counter 171. The trunk groups No. 1 – No. 4 are one-way circuits for outgoing traffic only. The trunk group No. 5 includes two-way circuits for either incoming or outgoing traffic. By way of example, all five diodes 77 in FIG. 2 may be associated with trunks which form a first trunk group 172 (FIG. 5); four exact duplicates of FIG. 2 (not shown) may form the four trunk groups No. 2 – No. 5. The particular trunk group containing the trunk to be allotted is selected by means of the ring counter 171. A rotation of trunk selection is insured since the ring counter steps after each call so that a different trunk group is always selected for each successive call.

As shown in FIG. 4, the system allotter 72 or clock pulse source provides an exemplary cycle of 20 pulses, with the cycle repeated endlessly, as long as the system is energized. Thus, the pulses of one exemplary cycle are marked "1, 2, 3, 4 . . . 20," and the start of the next cycle is marked "1, 2, 3 . . . ." These 20 pulse cycles enable the system to perform its complete sequence of operations. Obviously, the number 20 is arbitrary; any suitable number of pulses may be provided for each cycle.

The circuit of FIG. 5 operates this way. During the second clock pulse 2 (174) (FIG. 4), the ring counter 171 steps. Thereafter, it feeds an enabling mark to one of the trunk groups, via individual trunk group leads TG which lead to the switch 108 (FIG. 2). For example, on ring counter step 1, the conductor TG1 is marked to enable a trunk in group 172. On other steps, other trunk group leads are marked. The lead TK, which also leads to switch 108, applies a generally enabling marking to all trunks in all groups. These are markings applied through the access circuit 100, which causes one of the latch circuit to operate and select a trunk circuit. Thereafter, that trunk circuit is pre-assigned to serve the next call.

Responsive to clock or allot pulse 3 (175), the TK lead 173 is marked to inhibit a general trunk allot function. During this period a call demanding the service of an outgoing trunk circuit uses the trunk circuit which was pre-assigned during pulse 2 (174) to complete a call. Since all outgoing calls are initiated following the allotment or pre-assignments, that trunk in group No. 1 should be used. At the end of the clock or allot pulse 3 (175), the inhibiting potential disappears from the TK lead 173. Thereafter, the effect of the marking on the lead TK is to enable every trunk in all groups.

Therefore, if the assigned trunk in group No. 1 (172) fails to operate properly, any trunk may be selected at random from any trunk group. Or, if there is an incoming trunk call, it necessarily appears in trunk group No. 5 which can be allotted only responsive to a signal on the TK lead 173.

When the next clock or allot pulse 2 (176) appears, the ring counter 171 marks the trunk group lead TG 2 and enables a selection of a trunk in group No. 2 during a pulse 3, (177). The ring counter 171 steps on to prepare for an assigning a trunk in the group No. 3 during the next pulse 2 in the cycle not shown in FIG. 4.

If any outgoing call is demanding the services of a trunk during the cycle containing pulse 177, the selected trunk in group No. 2 completes the call during the 3 pulse, 177 while the inhibit mark is on TK conductor 173. Thereafter, the inhibit mark is removed from the TK conductor 173, again enabling all trunk circuits. Thus, if the pre-assigned trunk in group No. 2 fails, any operative trunk may take over.

Briefly in resume, as the ring counter 171 steps, one step per allot cycle, each outgoing trunk group is enabled in sequence to select one of its outgoing trunks to serve the next call. Since the outgoing trunk calls are normally completed during the next or 3 pulse, the outgoing calls are normally carried by the pre-assigned trunk and are distributed over the trunk groups No. 1 – No. 4, one at a time and in sequence. If, for any reason, there is a trunk failure, any trunk may be alloted at random when the inhibit is removed from the TK lead 173 at the end of the 3 pulse.

Since the trunk group No. 5 is not enabled from the ring counter 171, it will not normally be used on outgoing calls unless there is a failure of the selected trunk in a group 170, followed by a random selection responsive to removal of the inhibit from the lead 173. Also, since none of the trunk groups 1–4 have incoming trunks associated therewith, it is apparent that only the trunk group No. 5 is available for incoming calls. Therefore, it doubles as an overflow for busy conditions on outgoing calls.

Accordingly, it is not possible for one faulty trunk to be allotted every time that a call is placed.

Means are provided for giving a class of service mark indicates whether the line demanding a particular kind of service is entitled to receive that service. More particularly, as shown in FIG. 6, a diode 180 either is or is not provided to connect a line 73 to the class of service bus 56 depending upon whether the line 73 is or is not entitled to receive the indicated kind of service.

The question of whether the diode 180 is used to transmit an enable or an inhibit signal depends upon how the user intends to use it. If most lines are allowed to make a type of call, less diodes are required to mark the lines which are not allowed to make them. Or if most lines are precluded from making this type of call, less diodes are required to mark the allowed lines. Thus, the diode 180 may be either an enabling or an inhibiting signal.

Figure 6:
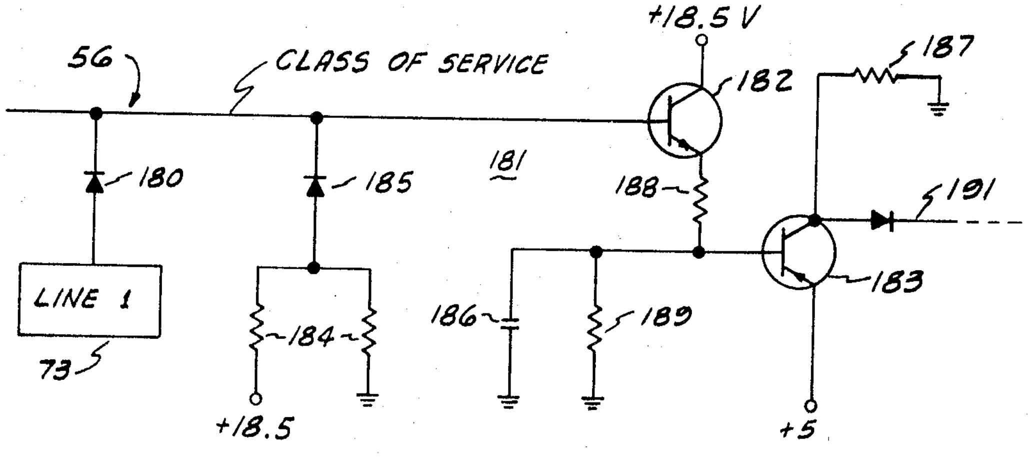
FIG. 6 is a schematic representation of a class of service circuit.

The class of service mark detection circuit is shown at 181 (FIG. 6). This circuit may be part of the toll restrictor 58 or the class of service detector 57 (FIG. 1). The detector includes transistors 182, 183. The transistor 182 is an NPN emitter follower biased to always be turned on. The transistor 183 is a PNP common emitter amplifier, biased by the circuit at 184. Normally, the transistor 183 is on and shunting resistor 189 during idle state conditions. The diode 185 isolates the bias potential at 184 from marking the bus 56 during class of service read out while the line circuit 73 is marking the bus 56. The capacitor 186 is a transient by-pass, and the resistor 187 is a load for transistor 183.

The impedance, as seen from the class of service bus 56, is the impedance in the emitter circuit of the transistor 182, multiplied by the signal current gain of the transistor (the so-called beta of the transistor ). Therefore, the emitter resistors 188, 189 fixes the impedance seen on the bus 56 looking out from the line circuit 73.

When the line circuit 73 marks the end of a desired path in the network 50, the class of service bus 56 goes positive, and the transistor 182, which normally conducts at a low level, comes on harder. This raises the IR drop across the resistors 188, 189, and turns off the transistor 183 to remove the shunt across resistor 189. A much larger impedance is seen from the bus 56. When the transistor 183 turns off, a digital signal appears at the output 191 which may be interpreted in any desired manner by any suitable logic circuits.

When the line circuit 73 removes the marking from the class of service bus 56, the transistor 182 tends toward turn off and returns to the normal low level conductive state. This, in turn, causes a lower level of current flow through the resistors 188, 189. The transistor 183 turns on, and the digital signal disappears from the output 191. The resistor 189 is again shunted, and the impedance on the class of service bus 56, as seen from the line circuit 73, goes down.

Briefly, in review, the impedance on the class of service bus 56 is lower during the idle state than during the busy state. The effect is to sharpen the class of service pulses as transmitted, and to produce a switching effect at output 191 which is somewhat similar to the switching effect of a Schmidt trigger.

While the principles of the invention have been described above in connection with specific apparatus and applications, it is to be understood that this description is made only by way of example, and not as a limitation on the scope of the invention.

We claim:

1. A telephone system comprising a trunk allotter circuit, a plurality of trunk circuits arranged in groups, means comprising a plurality of current controlled switches connected in parallel, one side of each switch being individually associated with a corresponding one of said trunk circuits, and the other side of all of said switches being connected to a common point in said trunk allotter, means for enabling at least one of said parallel switches to fire responsive to a signal at said common point, means for thereafter reducing the number of said fired switches to one, and means for pre-assigning the trunk associated with said one fired switch to serve the next call.

2. The system of claim 1 and means for precluding the pre-assignment of any trunk twice in succession.

3. The system of claim 1 and means effective during limited periods of time for successively enabling individual switches by groups to serve successive calls, whereby no two successive calls are served by the same group, and means responsive to said enabling means for causing said pre-assigned trunk to serve the next call immediately after said limited period of time.

4. The system of claim 3, and means for enabling all of said switches after said pre-assigned trunk has had an opportunity to serve a call after said limited period of time, whereby any trunk in any group may be pre-assigned if the trunk pre-assigned during the said limited period of time failed to operate.

5. A trunk allotter comprising means for selecting one of many trunk circuits, means for rotating the selections so that the same trunk circuit is not selected twice in succession, means for causing said selected trunk circuit to operate, and means for thereafter enabling any one among all of said trunk circuits to be selected if said selected circuit fails to operate.

6. The allotter of claim 5, wherein said selecting means comprises a plurality of current controlled switches that fire at random.

7. The allotter of claim 6 wherein said switches are a plurality of general purpose diodes, each of said diodes having electronic latch means individually associated therewith, said latch circuit providing means for holding fired diodes and barring selection of a fired diode.

8. The allotter of claim 7 and class of service means for barring use of said allotter by a subscriber who is not entitled to so use the allotter.

9. The allotter of Claim 8 and means for thereafter monitoring the use of said selected trunk circuit, and restricting means for preventing a non-barred subscriber from thereafter using said selected trunk circuit in a manner which is restricted by said class of service means.

10. The network of Claim 9 and a common bus for sending class of service signals to said class of service means, and restricting means, a gate circuit connected to said common bus, means in said gate circuit for reflecting a predetermined impedance to said bus during non-signal conditions on said bus, and means responsive to signal conditions on said bus for increasing said reflected impedance.

11. The allotter of Claim 8 and means for sending a class of service signal over a common bus to said class of service means, and means responsive to said signal for increasing the impedance of said class of service means.

12. A switching network comprising a plurality of diodes connected on one side to a common bus and connected on the other side to a plurality of individually associated latch circuits, means responsive to the application of a potential to said common bus for firing at least one of said latch circuits, means for thereafter reducing the number of said fired latch circuits, to one, and means for holding said one latch circuit in a fired condition to preclude a second firing of said latch circuit.

13. The network of claim 12 wherein each of said latch circuits comprises a PNP and an NPN transistor, the base of each transistor being connected to the collector of the other transistor.

14. The network of claim 13 and means for applying an enabling signal to the emitter of a first of said transistors and connecting said other side of said diode to the emitter of said other transistor.

15. The network of claim 14 wherein said enabling means comprises means for grouping the emitters of said first one of said transistors, and stepping means for sequentially and successively applying an enabling signal to individual groups of said emitters of said transistors.

16. The network of claim 15 and means effective immediately after said sequential and successive application of said enabling signal for applying said enabling signal to all emitters of said first transistors.

* * * * *